W. H. BOUTELLE.
OPHTHALMIC MOUNTING.
APPLICATION FILED JAN. 23, 1920.
1,372,596.
Patented Mar. 22, 1921.
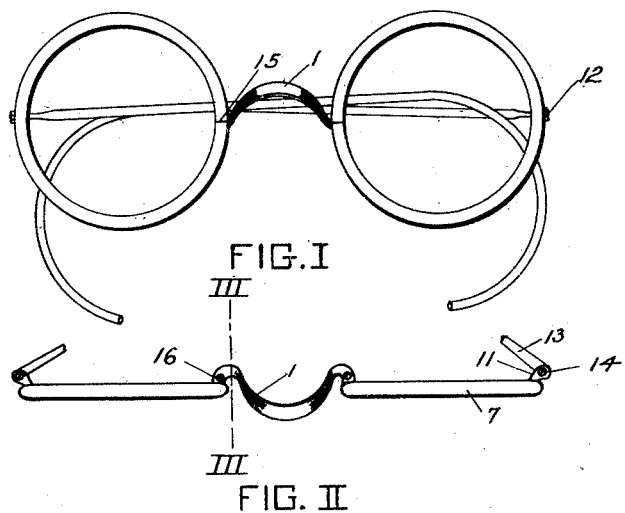
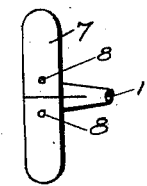
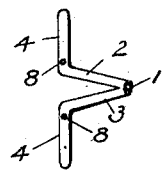
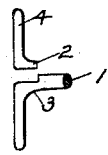
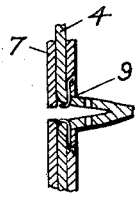
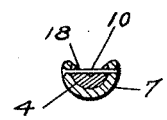
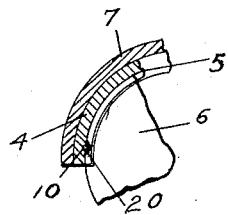
INVENTOR
WILLIAM H. BOUTELLE
BY
ATTORNEYS

UNITED STATES PATENT OFFICE.

WILLIAM H. BOUTELLE, OF STURBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,372,596.   Specification of Letters Patent.   Patented Mar. 22, 1921.

Application filed January 23, 1920. Serial No. 353,464.

*To all whom it may concern:*

Be it known that I, WILLIAM H. BOUTELLE, a citizen of the United States, residing at Sturbridge, in the county of Worcester and State of Massachusetts, have invented certain new and useful Improvements in Ophthalmic Mountings, of which the following is a specification.

This invention relates to improvements in ophthalmic mountings and has particular reference to what is commonly termed a frame, that is to say, a rimmed member for carrying a pair of ophthalmic lenses on the face.

Prior to my invention it has been customary to split what is known as a spectacle frame at the outer side or temple end piece, the split being necessary for the insertion or removal of a lens from the mounting. This has been attended by certain difficulties, however, due to the fact that in opening the structure at the end piece there is considerable liability of the temple dropping out and further due to the fact that the person assembling the spectacle in replacing the several parts must so adjust the end pieces as to satisfactorily retain in position the temple, retain the lens in position within the rim, make sure that all the parts properly fit and match, and also secure in position the fine and delicate easily lost screw which serves to hold the parts together.

One of the objects, therefore, of my present invention is the provision of an improved type of mounting which will obviate all the difficulties previously experienced, will preferably eliminate the joint at the outer side of the mounting or at the position of the temple, will greatly facilitate insertion or removal of a lens from the mounting, and will obviate the difficulties caused by spreading of the frame ends widely apart when released, but will hold them in position where they may be readily tightened with minimum liability of loss of the retaining screw during the operation of mounting the lens.

A further object of the present invention is the provision of a novel and improved frame joint which shall be particularly adapted for use in what is known as combination frames or frames having both metallic and non-metallic parts, and which will particularly lend itself to such constructions by rendering the metallic portions of minimum visibility increasing the artistic appearance and desirability of the frame, while in addition possessing the several advantages above enumerated.

Other objects and advantages of my improved construction should be apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of a mounting embodying my improvement.

Fig. II represents a plan view thereof.

Fig. III represents a sectional view as on the line III—III of Fig. II.

Fig. IV represents a view similar to Fig. III with the joint open and non-metallic frame portion removed.

Fig. V represents a similar view of a slightly modified form of the invention.

Fig. VI represents another view thereof.

Fig. VII represents a sectional view illustrating another manner of attaching the non-metallic material.

Fig. VIII represents a view of a still further manner of attaching the same.

Fig. IX represents a vertical sectional view of the structure shown in Fig. VIII.

In the drawings, in which similar characters of reference are employed to denote corresponding parts throughout the several views, the numeral 1 designates the bridge member of the mounting, which is preferably split at each end to provide the furcations 2 and 3, respectively, secured at their free ends to the termini of the metallic frame or rim member 4, which rim member is interiorly grooved at 5 to receive the beveled edge of the lens 6, and is preferably surrounded by the non-metallic protecting frame portion 7. This frame portion 7 may be secured in position on the rim member 4 either by the rivets, studs or staples 8, as illustrated for example in connection with Fig. IV, by the bent wire or staple members 9 shown in Fig. VII, or by the transverse pins 10 shown in Figs. VIII and IX, these latter possessing peculiar advantages not possessed by the other forms described, and consequently forming a preferred embodiment of my invention.

In the past in the construction of combination mountings of the type here illustrated it has been customary to have more or less of the metal of the bridge and end pieces shown when the mounting is viewed from the front, frequently to the extent of long sleeves being carried by the bridge and end pieces and squeezed onto the non-metallic material. These patches in my opinion detract from the ornamental and desirable appearance of the mounting, as well as possessing the disagreeable feature of lateral reflections to the eye, interfering with the vision of the wearer. It is, therefore, desirable, both from a useful and from an aesthetic viewpoint to eliminate these patches when possible. This I accomplish in the present invention by securing to the rear of the rim 4 the rearwardly and if desired outwardly extending lugs 11 slotted as at 12 to receive the temples 13, which are secured in position by the pivot screws 14. In place, however, of having the frames themselves split at this outer end, I preferably make the end pieces as a solid slotted block, thus facilitating their construction and attachment and insuring best retention in position of the temple members 13. To enable the frame to be opened centrally I have split it as at the point 15, and as previously mentioned, secure to the ends of the frame the furcations or arms 2 and 3 of the bridge member 1. These arms may be readily sprung apart as shown in Fig. IV so that the frame may be opened for insertion or removal of a lens but at the same time the furcations may be readily drawn together as by the screw 16 closing up the frame to lock the lens in position. If preferred the joint might be of the type illustrated in Fig. IV in which the portions 2 and 3 are separate from each other or in the form of the single looped member 17 of Fig. VI, in which the bridge 1 is soldered to the loop and the arms of the loop are drawn together by the screw 16. The advantage of having either the ends of the bridge split or a looped or furcated member or lug, such as 16 to which the bridge is secured, is that these lugs may be placed on the rear face of the mounting in an entirely inconspicuous position where they are in fact concealed as by the width of the member 7 and while being capable of being sprung open sufficiently to insert the lens, prevent the ends of the frame coming apart and being difficult to retain together, while the retaining screw 16 is being tightened.

It will be noted by reference to Fig. I that when a mounting constructed in accordance with my improvement is being used the only metal showing is the bridge 1 and a possible suggestion of the tips of the end pieces 11, but there are no unsightly or light catching and reflecting patches or portions anywhere on the front of the frame. It will thus be seen that the frame may be readily opened or closed for insertion of a lens without in anywise disturbing the temple, that the temple may be removed or replaced without disturbing the fit of the lens, and that the frame will at all times be held together whether the screw 16 be in position or not, facilitating assembling of the mounting and rendering separation and loss of parts much less liable to occur than with prior art mountings.

I would also call particular attention to the manner in which the non-metallic member 7 is held in position in Figs. VIII and IX, in that in these figures the metallic rim 4 is notched as at 18 to receive the transversely extending pin 10 which pierces both sides of the frame member 7 and projects somewhat within the lens receiving groove 5. The lens, on the other hand, is provided with the notch 20 to receive this pin; the engagement of the pin 10 with the notch 20, therefore, absolutely locks the lens against any liability of rotation or changing from axis in the case of a round frame, such as shown in Fig. I, and at the same time this structure provides a secure means of holding the non-metallic material in position around the metallic frame without possibility of outward springing or warping or twisting away, or longitudinal shifting of the zylonite material on the metallic frame, in the event that it is not properly or sufficiently cured.

The form of invention shown in Fig. V is substantially the same as the other views of the drawing, with the exception that the ears 2 and 3 in place of being integral are cut or separated and designed to be suitably drawn together and united.

I claim:

1. In an ophthalmic mounting the combination with a grooved lens receiving member, of a covering overlying said member and a connection between said parts comprising a cross member passing transversely of the grooved lens receiving member and its covering and projecting within the groove to form a lens lock.

2. In an ophthalmic mounting the combination with a round eye grooved lens receiving member, of a lens fitting within said member having a notch in its edge, a covering for the lens receiving member extending therearound and a securing device for said covering passing transversely through the rim and covering and through the notch in the lens to both secure the covering in position and lock the lens against rotation within the rim.

3. In an ophthalmic mounting the combination with a grooved circular lens receiving rim, of a lens having a bevel edge fitting within the rim and having a notch formed in said edge and a lens locking member in the form of a pin passing transversely through the frame edges and through the notch in the lens for securing the parts against relative rotation.

In testimony whereof I have affixed my signature, in presence of two witnesses.

WILLIAM H. BOUTELLE.

Witnesses:
   E. M. LAFLER,
   ALICE G. HASKELL.